United States Patent [19]

Small et al.

[11] Patent Number: 4,927,663
[45] Date of Patent: May 22, 1990

[54] METHOD FOR MINIMIZING CURLING IN SCREEN PRINTING

[75] Inventors: Richard F. Small, Gillingham; Dakshesh S. Patel, Harrow, both of United Kingdom; Lascelle A. Barrow, London; Barry M. Dix, Middlesex, both of England

[73] Assignee: Small Products Limited, London, England

[21] Appl. No.: 254,800

[22] PCT Filed: Jul. 30, 1987

[86] PCT No.: PCT/GB87/00541
§ 371 Date: Sep. 30, 1988
§ 102(e) Date: Sep. 30, 1988

[87] PCT Pub. No.: WO88/00889
PCT Pub. Date: Feb. 11, 1988

[30] Foreign Application Priority Data

Jul. 30, 1986 [GB] United Kingdom ............... 8618595
Aug. 6, 1986 [GB] United Kingdom ............... 8619245

[51] Int. Cl.$^5$ .................... B05D 3/06; B05D 1/32; B05D 3/02; B05D 5/00
[52] U.S. Cl. ................................ 427/40; 427/259; 427/264; 427/265; 427/272; 427/288
[58] Field of Search .............. 427/259, 264, 282, 272, 427/288, 265, 40; 101/129, 115

[56] References Cited

U.S. PATENT DOCUMENTS

| 3,470,054 | 9/1969 | Tyrrell | 156/210 |
| 3,499,781 | 3/1970 | Krueckel | 430/295 |
| 3,574,617 | 4/1971 | Skoultchi | 430/281 |
| 4,113,895 | 9/1978 | Watt et al. | 427/44 |

FOREIGN PATENT DOCUMENTS 2371241 6/1978 France.

Primary Examiner—Evan Lawrence
Attorney, Agent, or Firm—McAulay Fisher Nissen & Goldberg

[57] ABSTRACT

A method of silk screen printing on a piece of paper, such as poster paper, in which a first silk screen printing is effected onto the sheet utilizing a printing ink that produces minimal curl in the edge of the sheet, and at least one subsequent silk screen printing is effected onto the sheet utilizing a water-based printing ink. The resulting curl is less than that which would be obtained if the first screen printing were made with the water-based ink.

29 Claims, No Drawings

METHOD FOR MINIMIZING CURLING IN SCREEN PRINTING

This invention relates to printing and in particular to screen printing (commonly known as silk screen printing). As is well known, the silk screen printing process involves the use of a screen of silk, polyester, nylon, metal gauze or any other suitable mesh-like or perforated material. For convenience (and for consistency with the terminology historically employed in this art) the term "silk screen printing" will be used herein and it will be appreciated that no restriction to "silk" material is thereby intended.

Although silk screen printing is a very old technique, it still has numerous problems and/or limitations associated with it. For example, where several large-size multi-color sheets are to be silk screen printed for, say, a poster to be pasted up on a hoarding, large quantities of printing inks are needed which are expensive.

The printing inks required for screen printing are quite different from those to be used for other forms of printing. The screen printing inks being generally used at present are organic solvent-based and usually contain ethyl or nitro cellulose resins. They are dried in warm air tunnels by driving off the organic solvents, and are thus potentially hazardous to the printing operatives. Another problem which arises with such organic solvent-based screen printing inks, relates to solvent loss from the ink on the printing screen whereby the ink increases in viscosity and after a certain period of time will not properly pass through the open areas of the printing mesh. This "drying in" results in loss of printed image and is described as screen stability, i.e. inks with poor screen stability "dry in" rapidly.

Recent developments over the last ten years have seen the introduction of ultraviolet-curing screen process inks.

Here the formulations use raw materials which do not increase in their viscosity on the printing screen but instead dry by exposure to intense ultraviolet (UV) light. This means that this type of ink has almost unlimited screen stability compared to non-UV curing, organic solvent-based, screen printing inks. However, such UV-curing inks are expensive, and leave a very thick print coat on the paper surface — particularly where multi-color, e.g. four-color, silk screen printing is effected.

Such thick or heavy print images on the surface of a sheet of poster paper often necessitate that for mounting the poster to its hoarding, a special adhesive — which is other than an inexpensive starch-based adhesive — must be used if efficient bonding is to be achieved. A similar problem often arises with the older type of organic solvent-based silk screen printing inks. This adhesion problem is common where the individual sheets overlap, e.g. at overlapping marginal edges of adjacent poster sheets. The back of the top sheet does not have sufficient adhesion to the ink dries out, the top sheet of the overlap often curls up and away from the sheet underneath. The problem is particularly severe when the paper is completely covered with several layers of ink. Posters printed with offset litho inks have less tendency to curl when they dry out compared to those produced with screen printing inks. As the screen printing process achieves its high quality print appearance by a much higher ink deposit, the curl problem is pronounced with screen printing inks. Therefore the adhesives used with screen printed posters need to have better adhesion properties to prevent overlap curl.

Mixtures of one or more starch adhesives and one or more polyvinyl alchol (P.V.A.) adhesives were investigated by the applicants, and these were found to give a much improved adhesion at the overlapping edges of superimposed sheets as compared to a 100% starch-based adhesive product. However, mixtures of starch and P.V.A. adhesives have the disadvantage of being more expensive and the resultant improved adhesion makes the removal of the total poster from the hoarding more difficult. Thus they are not likely to find favour with bill-posters, i.e. those responsible for putting up the posters on the hoardings.

It is therefore considered desirable to reduce, if not wholly obviate, some or all of the above-mentioned and/or other disadvantages associated with or relating to prior art screen printing methods and inks.

According to one aspect of this invention there is provided a method of silk screen printing on a sheet of paper or board, characterised in that a first silk screen printing is effected on the sheet utilizing a printing ink that produces minimal curl, and in that at least one subsequent silk screen printing is effected on the sheet utilizing a waterbased printing ink.

By effecting said first printing with an ink that produces minimal curl, the printed sheet can be readily fed again through the screen printing machine to be overprinted with the subsequent printing(s).

Said first silk screen printing may be effected utilizing an organic-solvent-based printing ink, or a non-aqueous printing ink that is curable by irradiation, or an aqueous ink of high solid and low water content, e.g. water content less than 20%.

It is considered that the printing ink used for the first printing in effect seals the surface of the paper sheet thereby reducing the risk of damage to the sheet from the water content of the water-based printing ink.

Preferably, the first silk screen printing is in a first color and the or each said subsequent printing is in a different color.

Preferably, said water-based printing ink used for the or each subsequent printing is at least partially curable by irradiation. As used herein in relation to curing, the term "irradiation" refers to electromagnetic radiations having wavelengths shorter than those of the visible spectrum. The term thus includes ultraviolet (UV) and electron beam radiations.

Preferably, the water-based printing ink used for the or each subsequent printing comprises one or more photoinitiators and is at least partially curable by irradiation comprising electromagnetic radiations in the ultraviolet light waveband.

Alternatively, the water-based ink used for the or each subsequent printing may be at least partially curable by irradiation with an electron beam. Where the ink is curable by irradiation with an electron beam, then photoiniator(s) may be omitted from the printing ink composition.

Preferably, and in either case, the water-based printing ink used for the or each subsequent printing is subjected to heat or to thermal radiation, e.g. is subjected to electromagnetic radiations in the infrared light waveband, prior to curing. Alternatively, the print is subjected to cold air from a jet air dryer or is subjected to microwave or radio frequency drying.

Preferably said water-based ink used for the or each subsequent printing comprises an unsaturated acrylate resin, e.g. a polyester acrylate resin.

Advantageously, the water-based screen printing ink used for the or each subsequent printing comprises an emulsion of a resin in water.

Preferably the emulsion has said resin wholly, or at least substantially, as the dispersed phase and wholly, or at least substantially, insoluble in water, water being the continuous phase of the emulsion.

Advantageously said resin comprises 30% to 60% (preferably 50%) of the emulsion.

Preferably, said method is employed to screen print a plurality of colors upon a sheet and, after printing, the printed sheet is subjected to corona discharge to render the sheet readily mountable, e.g. upon a hoarding, by use of a starch-based adhesive.

It is considered that the corona discharge provides miniscule perforations through the printing ink which enable the adhesive to extend through the sheet to provide a "keying" effect facilitating the efficient bonding together of overlapping marginal edges of adjacent sheets.

The following relates to the production of individual silk screen printed sheets and their treatment for application onto hoarding sites in accord with embodiments of the present invention. As well as single sheet posters, the embodiments are concerned with the usual combinations of multiple sheet posters (e.g. "16 sheet", "48 sheet" or "96 sheet" posters) for pasting up onto large hoardings. The screen printing method used in these embodiments may be for the production of four color halftone prints as well as continuous line and tone color prints.

The following embodiments of this invention concern the screen ink used to print the sheets.

In one preferred form of a "four-color printing" screen process embodying the present invention, the first color printed is with a non-aqueous UV-curing printing ink of cyan shade, e.g. a screen ink having a composition in accord with Example 6 below.

In another preferred form of the "four-color printing" screen process, the first color printed is with an organic solvent-based printing ink of cyan shade, e.g a screen ink, having a composition in accord with Example 7 below.

In yet another preferred form of the "four-color" screen printing process, the first color printed is with a slightly aqueous (i.e. less than 20%), predominantly solids (i.e. greater than 80%), screen printing ink of appropriate, e.g. cyan, shade The screen ink employed for the first printing in this case preferably has a composition in accord with Example 8 below.

Although in each of these three cases the screen ink employed for the first color is of cyan shade, it will be appreciated that the color can be any other primary trichromatic color, and usually will be the predominant or principal color produced by the photographic color separation of the original.

In the following preferred embodiments of the invention, each of the subsequent colors printed in superimposition on the first color, is screen printed in a water-based, UV-curing ink. In thee preferred embodiments the water-based, UV-curing screen ink comprises an emulsion of a resin in water, said resin being wholly (or at least substantially) in dispersed phase and wholly (or at least substantially) insoluble in the water, the water being the continuous phase of the emulsion. Thus the screen printing ink employed for the or each subsequent printing contains water, is water miscible and is water thinnable to a considerable extent, but the water is to be regarded as a carrier or diluent (rendering the ink aqueously reducible in viscosity) rather than as a solvent Preferably the ink employed for the or each superimposed printing contains at least 40% water.

In a first embodiment of this invention the water-based printing ink employed for the or each subsequent printing has a composition comprising an ultraviolet curing resin emulsified with water, a photoinitiator and an aqueous pigment dispersion One specific formulation of this, in which the emulsion has the resin amounting to 50% of the emulsion, is given in Example 1.

| Example 1 | Parts by weight |
| --- | --- |
| Emulsion Laromer* PE 55W[1] | 95.3 |
| Darocur* 1173[2] Photoinitiator | 2.0 |
| Aquadisperse Phthalo Blue GB EP[3] | 2.7 |

A composition as formulated in Example 1 was printed through a screen made from 165 threads per cm polyester mesh half-calendered. The calendered side was positioned face down towards the substrate, ie M.G (machine glazed) poster paper. The stencil was made from direct emulsion using a half-tone positive The print was produced on an S.P.S. cylinder action screen printing press. The ink was dried through a two lamp S.P.S. UV dryer (rated at 300 watt per inch). The resultant dried print was a good half tone image of high definition.

However, this initial formulation, when tested, gave poor screen stability. This was improved, in a second embodiment, by the addition of n-vinyl pyrrolidone — a solvent miscible with water which also takes part in the curing reaction. A specific formulation of this second embodiment, which likewise has the resin amounting to 50% of the emulsion), is given in Example 2.

| Example 2 | Parts by weight |
| --- | --- |
| Laromer* PE 55W[1] | 85.3 |
| Darocur* 1173[2] | 2.0 |
| Aquadisperse Phthalo Blue GB EP[3] | 2.7 |
| n-vinyl pyrrolidone[4] | 10.0 |

A composition as formulated in Example 2 was printed and dried in the same manner as for Example 1. The resultant dried print was a good half tone image of high definition.

Due to the relatively high price of this water-miscible solvent, i.e. the n-vinyl pyrrolidone, comparted to the other materials used in the formulation, the final material cost was considered uneconomic. To offset this, a calcium carbonate extender was introduced into the composition to obtain a third embodiment with an acceptable raw material cost. A mixture of photoinitiators was also used in place of the single type. A specific formulation of this third embodiment, which likewise had the resin amounting to 50% of the emulsion, is given in Example 3.

| Example 3 | Parts by weight |
| --- | --- |
| Emulsion Laromer* PE 55W[1] | 63.3 |
| Aquadisperse Phthalo Blue GB EP[3] | 2.7 |
| N Vinyl Pyrrolidone[4] | 5.0 |
| Omyalite* 95T Extender[5] | 20.0 |
| Photoinitiator Irgacure* 651[6] | 6.0 |

-continued

| Example 3 | Parts by weight |
|---|---|
| Photoinitiator Quantacure* ITX[7] | 3.0 |

A composition formulated as in Example 3 was printed and dried in the same manner as for Example 1. The resultant dried print was a good half tone image of high definition.

Samples of four colors Trichromatic yellow, magenta, cyan and black were made for container storage stability trials.

After four weeks storage, the magenta and black inks had gelled whereas the yellow and cyan were unchanged. Further work was carried out to improve storage stability. In order to retain screen stability and an economic raw material cost, a fourth embodiment was devised in which the n-vinyl pyrrolidone and the photoinitiator mixture were replaced by a solvent, ethoxy-propanol, and a single initiator compound rather than the mixture of photoinitiators. The calcium carbonate extender was also omitted as this was not now required to obtain an acceptable raw material cost. A thickening agent was introduced to maintain the ink at a printable viscosity. Slight improvements in screen stability were obtained with this embodiment by the introduction of small amounts of a humectant/surfactant compound and of a silicone emulsion lubricant. A specific formulation of this fourth embodiment, in which (as before) the resin amounted to 50% of the emulsion, is provided in Example 4.

| Example 4 | Parts by weight |
|---|---|
| Laromer* PE 55W[1] | 75.2 |
| Darocur* 1173[2] | 2.9 |
| Ethoxy Propanol[8] | 9.7 |
| Curlout Plus*[9] | 5.8 |
| Alcoprint* PTF[10] | 0.5 |
| Alcoprint* PHL[11] | 1.0 |
| Alcoprint PSJ[12] | 1.9 |
| Aquadisperse Phthalo Blue GB EP[3] | 3.0 |

A composition formulated as in Example 4 was printed and dried in the same manner as for Example 1 The resultant dried print was a good half tone image of high definition.

The storage stability of trichromatic yellow, magenta, cyan and black printing inks with this latest formulation were then retested and found to be satisfactory.

To provide a completely aqueous-based composition avoiding the use of any inflammable solvents, a fifth embodiment was devised in which the ethoxy propanol was replaced by a mixture of water and an acrylic monomer — Tripropylene glycol diacrylate (T.P.G.D A.) — for maintaining the appropriate dispersion of the resin solids. A specific formulation of this fifth embodiment is provided in Example 5.

| Example 5 | Parts by weight |
|---|---|
| Laromer* PE 55W[1] | 61.6 |
| Darocur* 1173[2] | 3.1 |
| Acrylic Monomer T.P.G.D.A.[13] | 7.7 |
| Water | 15.4 |
| Curlout Plus*[9] | 5.7 |
| Alcoprint* PTF[10] | 0.5 |
| Alcoprint* PHL[11] | 1.0 |
| Alcoprint* PSJ[12] | 2.0 |

-continued

| Example 5 | Parts by weight |
|---|---|
| Aquadisperse* Phthalo Blue GB EP[3] | 3.0 |

A composition formulated as in Example 5 was printed and dried in the same manner as for Example 1 . The resultant dried print was a good half tone image of high definition All the above-mentioned tests were carried out using 60"×40" (1.5mm×1m) machine glazed (M.G.) Poster Paper. It was found that when heavy deposits of color were used across the whole area of the paper, a high degree of curl at the edges of the paper was experienced if the first color printed down onto the paper was not a non-aqueous UV-curing ink (e.g. such as that of Example 6 below), or was not an organic solvent-based printing ink (e.g such as that of Example 7 below), or was not an ink of a high solids/low water composition (e.g. such as that of Example 8 below), i.e. an ink which contains less than 20% water.

| Example 6 (referred to above) | Parts by weight |
|---|---|
| Isol* Phthalo Blue GB PE 370[14] | 1.5 |
| Synocure* 3101[15] | 50.0 |
| Acrylic Monomer T.P.G.D.A.[13] | 33.4 |
| Quantacure* ITX[7] | 2.9 |
| N. Methyl Diethanolamine[17] | 1.9 |
| Irgacure 651[6] | 5.7 |
| 20cs Dimethyl Silicone Fluid[16] | 1.0 |
| Thickening Agent Cab-O-Sil* M5[18] | 1.7 |
| Matting Agent TS100[19] | 1.9 |

A composition formulated as in Example 6 was printed and dried in the same manner as for Example 1. The resultant dried print was a good half tone image of high definition.

| Example 7 (referred to above) | Parts by weight |
|---|---|
| Piccolastic* A5[20] | 1.67 |
| Ethoxy Propanol[8] | 9.33 |
| N Propanol[21] | 4.33 |
| Di-octyl Phthalate[22] | 1.67 |
| Arcosolve* PM Acetate[23] | 26.00 |
| Predisol* Phthalo Blue GBPC[24] | 1.56 |
| Dispercel* Thixotrope 27E[25] | 7.00 |
| Xylene[26] | 10.67 |
| Shellsol* A[27] | 16.00 |
| Ethocel* 7 CPS[28] | 15.33 |
| GB Ester[29] | 6.44 |

A composition formulated as in Example 7 was printed through a screen made from 140 threads per cm polyester mesh. The stencil was made from direct emulsion using a half tone positive. The print was produced on a Svecia cylinder action screen printing press. The ink was dried through a warm air jet dryer. The resultant dried print was a good half tone image of high definition.

| Example 8 (referred to above) | Parts by Weight |
|---|---|
| Darocur* 1173[2] | 3.0 |
| Water | 15.0 |
| Aquadisperse Phthalo Blue GB EP[3] | 3.0 |
| UV Oligomer 85-578/79[30] | 77.5 |
| Alcoprint* PTF[10] | 0.5 |
| Silicone Antifoam S.882[31] | 1.0 |

A composition formulated as in Example 8 was printed and dried in the same manner as for Example 1. The resultant dried print was a good half tone image of high definition.

It was unexpectedly found that once the first (cyan) ink had been printed in a non-aqueous UV-curing printing ink (e.g. of Example 6), or in an organic solvent-based printing ink (e.g. of Example 7), or in a high solid, low screen ink (e.g. of Example 8) having 20% or less water, then water based inks according to Examples 1 to 5 — which contain at least 40, water — could nevertheless be used as additional colors without producing unacceptable curl of the paper, i.e. without preventing feeding of the printed sheet again through the screen printing machine.

The water-based inks of Examples 1 to 5, when cured only by UV radiation were found to have a wet rub-resistance not adequate for all purposes, and to have a variable gloss level. Experiments were carried out with infra red heating just before UV curing of the water-based inks was effected. This technique produced prints with good wet rub-resistance and with a substantially uniform level of gloss. It is thought that this was due to the removal of excess water by the infrared heating. It was also found that more efficient water removal could be achieved by using a jet air dryer to force cold air over the print. It is considered that excess water might be removed, additionally or alternatively, by microwave or radio frequency drying.

Tests were conducted in pasting up the individual sheets to produce hoarding posters, and starch based pastes (obtained from Wilsons Adhesives and Morris Greenhaugh) were used for these tests. The surface of the final prints produced in accord with the above Examples was found to accept the starch pastes used by bill-posters more readily than prints printed with the conventional screen inks which are currently in general use. Prints produced with the water-based inks of Examples 1 to 5, when dried only by UV radiation, showed excellent adhesion properties with the starch adhesives. Such prints, when dried both by infra-red and by UV radiation, showed a reduction in adhesion properties but this was still an improvement on that attainable with multi-color prints produced with the standard organic solvent based screen printing inks. Nevertheless, by subjecting the final prints that had been dried by both infrared and UV radiation to corona discharge, this reduction in adhesion properties was overcome and prints with good gloss and wet-rub resistance were still obtained. In a preferred example, prints dried by infra-red and UV radiation were treated to 73 dynes/cm using a Sherman Treaters Corona Discharge Machine. These prints showed the same excellent adhesion properties that were obtained by just drying with UV radiation.

Notes

* means Trade Mark

1. Laromer * PE 55W is a 50% emulsion of a polyester acrylate in water obtainable from B.A.S.F.
2. Darocur* 1173 is a Hydroxy-2-methyl-1-propan-1-one obtainable from E. Merck.
3. Aquadisperse* Phthalo Blue GB EP is an aqueous dispersion of pigment Blue 15 obtainable from Tennant-K.V.K.
4. n-vinyl pyrrolidone is a UV reactive solvent obtainable from B.A.S.F.
5. Omyalite* 95T is a calcium carbonate extender obtainable from Croxton & Garry.
6. Irgacure* 651 is benzil dimethyl ketal obtainable from Ciba Geigy.
7. Quantacure* ITX is isopropylthioxanthone obtainable from Ward Blenkinsop.
8. ethoxy propylene glycol ether obtainable from B.P. Chemicals.
9. Curlout* Plus is a modified acrylic solution polymer obtainable from American Carbonyl Inc.
10. Alcoprint* PTF is an acrylic copolymer in mineral oil thicker obtainable from Allied Colloids.
11. Alcoprint* PHL is a humectant and surfactant blend obtainable from Allied Colloids.
12. Alcoprint* PSJ is a silicone emulsion softner/lubricant obtainable from Allied Colloids.
13. T.P.G.D.A. is a tripropylene glycol diacrylate obtainable from Degussa.
14. Isol* Phthalo Blue GBP 370 is Pigment Blue 15 obtainable from Tennant K.V.K. Ltd.
15. Synocure* 3101 is an epoxy acrylate obtainable from Cray Valley Products Limited.
16. Dimethyl silicone fluid 20csV viscosity obtainable from Basildon Chemical Company Limited.
17. N-Methyl diethanolamine is a tertiary amine, obtainable from B.A.S.F.
18. Cab-O-Sil* M5 is fumed silica obtainable from Cabot Carbon.
19. TS100 is a silica matting agent obtainable from Degussa.
20. Piccolastic* is a liquid styrene resin obtainable from Hercules Ltd.
21. N.Propanol is obtainable from B.P. Chemicals.
22. Di-octyl phthalate is obtainable form Charles Tennant (London) Ltd.
23. Arcosolve* PM Acetate is propylene glycol monomethyl ether acetate obtainable from Hays Chemical UNALCO.
24. Predisol* Phthalo Blue GBPC is a nitrocellulose dispersion of pigment Blue 15 obtainable from Tennant KVK.
25. Dispercel* Thixotrope 27E is a nitrocellulose dispersion of Bentone 27E gellant.
26. Xylene is obtainable from Shell Chemicals
27. Shellsol* A is an isomeric mixture of trimethyl benzenes obtainable from Shell Chemicals.
28. Ethocel* 7 CPS is ethyl cellulose resin otainable from Dow Chemicals.
29. GB Ester is butyl glycolate obtainable from Wacker Chemicals.
30. UV Oligomer 85-578/79 is a UV resin with 5% water content available from Hans Rahn & Co, Zurich.
31. Silicone Antifoam S.882 is a water miscible antifoam available from Wacker Chemicals.

We claim:

1. A method for minimizing substrate edge-curl in a process when a substrate is screen printed with a water-based screen printing ink comprising the steps of:
    (a) carrying out a first screen printing using an ink which produces a minimal curl in the substrate edge; and then
    (b) carrying out at least one subsequent screen printing on the printed substrate from step (a) using a water-based ink —,whereby any resulting curl is less than that which would be obtained if the first screen printing were with said water-based ink—.

2. A method according to claim 1, wherein said first silk screen printing is in a first color and each said subsequent printing is in different color.

3. A method according to claim 1, wherein the printing ink for said first screen printing comprises a non-aqueous printing ink that is at least partially curable by irradiation.

4. A method according to claim 3, wherein said nonaqueous printing ink that is curable by irradiation comprises one or more photoinitiators and is curable by irradiation comprising electromagnetic radiations in the ultraviolet light waveband.

5. A method according to claim 3, wherein said nonaqueous printing ink is curable by irradiation with an electron beam.

6. The method of claim 3 wherein the non-aqueous ink comprises:

|  | Parts by Weight |
| --- | --- |
| Pigment Blue 15 | 1.5 |
| Epoxy acrylate | 50.0 |
| Tripropylene glycol diacrylate | 33.4 |
| Isopropylthioxanthone | 2.9 |
| N-methyl diethanolamine | 1.9 |
| Benzil dimethyl ketal | 5.7 |
| Dimethyl silicone fluid | 1.0 |
| Fumed silica | 1.7 |
| Silica matting agent | 1.9. |

7. A method according to claim 1, wherein the printing ink for said first screen printing comprises an organic solvent based printing ink.

8. The method of claim 7 wherein organic solvent based printing ink comprises:

|  | Parts by Weight |
| --- | --- |
| Liquid styrene resin | 1.67 |
| Ethoxy propylene glycol ether | 9.33 |
| N-propanol | 4.33 |
| Di-octyl phthalate | 1.67 |
| Propylene glycol monomethyl ether acetate | 26.00 |
| Nitrocellulose dispersion of pigment Blue 15 | 1.56 |
| Nitrocellulose dispersion of Bentone 27E gellant | 7.00 |
| Xylene | 10.67 |
| Isomeric mixture of trimethyl benzenes | 16.00 |
| Ethyl cellulose resin | 15.33 |
| Butyl glycolate | 6.44. |

9. A method according to claim 1, wherein the printing ink for said first screen printing comprises an aqueous ink of low water and high solids content.

10. The method of claim 9 wherein the said aqueous ink comprises:

|  | Parts by Weight |
| --- | --- |
| Hydroxy-2-methyl-1-propan-1-one | 3.0 |
| Water | 15.0 |
| Aqueous dispersion of pigment Blue 15 | 3.0 |
| UV resin with 5% water content | 77.5 |
| Acrylic copolymer in mineral oil thickener | 0.5 |
| Water-miscible antifoam | 1.0. |

11. A method according to claim 1, wherein said water-based ink for each said subsequent screen printing comprises at least 40% water.

12. A method according to claim 1, wherein the water-based printing ink for each said subsequent screen printing is at least partially curable by irradiation.

13. A method according to claim 12, wherein said water-based printing ink that is at least partially curable by irradiation has a composition comprising one or more photoinitiators and is curable by irradiation comprising electromagnetic radiations in the ultraviolet light waveband.

14. A method according to claim 12, wherein said water-based ink is curable by irradiation with an electron beam.

15. A method according to claim 1, including subjecting the water-based printing ink for each said subsequent screen printing to heat or to thermal radiation, and then curing.

16. A method according to claim 1, including subjecting the water-based printing ink for each said subsequent screen printing to electromagnetic radiations in the infrared light waveband, and then curing.

17. A method according to claim 1, wherein the water-based printing ink for each said subsequent screen printing comprises an unsaturated acrylate resin.

18. A method according to claim 1, wherein the water-based printing ink for each said subsequent screen printing comprises a polyester acrylate resin.

19. A method according to claim 1, wherein the water-based printing ink for each said subsequent screen printing comprises an emulsion of a resin in water.

20. A method according to claim 19, wherein the emulsion has the said resin wholly, or at least substantially, in dispersed phase and wholly, or at least substantially, insoluble in water, the water being the continuous phase of the emulsion.

21. A method according to claim 19, wherein the resin comprises between 30% to 60% of the emulsion.

22. A method according to claim 19, wherein the resin comprises 50% of the emulsion.

23. A method according to claim 1, to screen print a plurality of colors upon a substrate, including subjecting, after printing, the printed substrate to corona discharge to render the substrate suitable for mounting by use of a starch-based adhesive.

24. The method of claim 1 wherein the ink in step (a) is selected from the group consisting of radiation curable non-aqueous printing inks, organic solvent based inks, and water-based inks having a water content sufficiently low to minimize edge-curling of the substrate.

25. A method according to claim 1 wherein the waterbased printing ink comprises:

|  | Parts by Weight |
| --- | --- |
| 50% emulsion of a polyester acrylate in water | 95.3 |
| Hydroxy-2-methyl-1-propan-1-one | 2.0 |
| Aqueous dispersion of pigment Blue 15 | 2.7. |

26. A method according to claim 1 wherein the waterbased printing ink comprises

|  | Parts by Weight |
| --- | --- |
| 50% emulsion of a polyester acrylate in water | 85.3 |
| Hydroxy-2-methyl-1-propan-1-one | 2.0 |
| Aqueous dispersion of pigment Blue 15 | 2.7 |
| N-vinyl pyrrolidone | 10.0. |

27. A method according to claim 1 wherein the waterbased printing ink comprises:

|  | Parts by Weight |
|---|---|
| 50% emulsion of a polyester acrylate in water | 63.3 |
| Aqueous dispersion of pigment Blue 15 | 2.7 |
| N-vinyl pyrrolidone | 5.0 |
| Calcium carbonate extender | 20.0 |
| Benzil dimethyl ketal | 6.0 |
| Isopropylthioxanthone | 3.0. |

28. A method according to claim 1 wherein the waterbased printing ink comprises:

|  | Parts by Weight |
|---|---|
| 50% emulsion of a polyester acrylate in water | 75.2 |
| Hydroxy-2-methyl-1-propan-1-one | 2.9 |
| Ethoxy propylene glycol ether | 9.7 |
| Modified acrylic solution polymer | 5.8 |
| Acrylic copolymer in mineral oil thickener | 0.5 |
| Humectant and surfactant blend | 1.0 |
| Silicone emulsion softener/lubricant | 1.9 |
| Aqueous dispersion of pigment Blue 15 | 3.0. |

29. The method according to claim 1 wherein the waterbased printing ink comprises:

|  | Parts by Weight |
|---|---|
| 50% emulsion of a polyester acrylate in water | 61.6 |
| Hydroxy-2-methyl-1-propan-1-one | 3.1 |
| Tripropylene glycol diacrylate | 7.7 |
| Water | 15.4 |
| Modified acrylic solution polymer | 5.7 |
| Acrylic copolymer in mineral oil thickener | 0.5 |
| Humectant and surfactant blend | 1.0 |
| Silicone emulsion softener/lubricant | 2.0 |
| Aqueous dispersion of pigment Blue 15 | 3.0. |

* * * * *